United States Patent [19]

Nemecsek et al.

[11] 4,429,183
[45] Jan. 31, 1984

[54] CIRCUIT ARRANGEMENT FOR DETECTING AND INTERPRETING INTERFERENCES WITH AUTOMATIC MACHINES AND PARTICULARLY COIN TELEPHONES

[75] Inventors: Ferenc Nemecsek, Sindelfingen; Elmar Wilke, Vaihingen, both of Fed. Rep. of Germany

[73] Assignee: International Standard Electric Corporation, New York, N.Y.

[21] Appl. No.: 310,349

[22] Filed: Oct. 13, 1981

[51] Int. Cl.³ .......................................... H04M 17/02
[52] U.S. Cl. .......................... 179/6.3 R; 179/175.2 C; 307/273; 221/21
[58] Field of Search ................. 179/6.3 R, 2 TC, 175, 179/175.1 R, 175.11, 175.2 R, 175.2 C; 307/273, 593, 601, 608, 97, 117; 221/21

[56] References Cited

U.S. PATENT DOCUMENTS 3,795,343 3/1974 Shigemori et al. ............... 221/21 X Primary Examiner—Stafford D. Schreyer
Attorney, Agent, or Firm—John T. O'Halloran; Peter R. Ruzek

[57] ABSTRACT

The present invention comprehends a circuit arrangement for detecting and interpreting interferences with automatic machines and particularly coin telephones. Free use of the automatic machine by manipulations (statically charged persons, electronic cigarette lighters or gas lighters) is prevented by means of a highly sensitive interference discriminator whose input is connected to the housing of the automatic machine or to an antenna, and whose output controls the malfunction detector in such a way that the latter blocks the use of the automatic machine when the discriminator responds.

6 Claims, 2 Drawing Figures

CIRCUIT ARRANGEMENT FOR DETECTING AND INTERPRETING INTERFERENCES WITH AUTOMATIC MACHINES AND PARTICULARLY COIN TELEPHONES

The present invention relates to a circuit arrangement for detecting and interpreting interferences with an automatic machine and particularly a coin telephone which is provided with a facility for detecting and interpreting internal machine faults and with other electronic control equipment.

Automatic machines, such as vending machines, coin telephones, gambling machines, and automatic ticket machines, are commonly provided with facilities which detect internal faults and, on the occurrence of certain types of faults, block the use of the automatic machine at least for the duration of the fault condition.

It was found that in the case of automatic machines provided with electronic control equipment, external interference with the operation of the machine is also possible. This may be effected, for example, by discharging statically charged persons or by manipulations with electronic cigarette lighters or gas lighters. Under certain circumstances, the automatic machine may be so influenced that use of the machine without payment is possible.

The technical object of the circuit arrangement according to the invention is to prevent any interference caused by discharging an external static voltage from resulting in a fault condition and particularly in a condition in which the automatic machine can be used free.

This object is achieved with the features of claim 1. The circuit arrangement according to the invention is based on the fact that the interference-voltage discharges critical for the operation of the machine differ from the uncritical voltage conditions in the environment of such automatic machines in the combination of the magnitude of the voltage and the time of discharge.

The discriminator used is advantageously a monostable multivibrator whose dwell time (unstable state) is chosen to be longer than any static interference-voltage discharges.

An embodiment of the invention will now be explained with reference to the accompanying drawing, in which:

FIG. 1 shows schematically a housing G of an automatic machine provided with internal electronic control equipment. This control equipment (remainder not shown) includes a facility E2 for detecting, indicating and interpreting internal machine faults, which, depending on the type of fault detected, may cause the automatic machine to be blocked.

Figure 1:
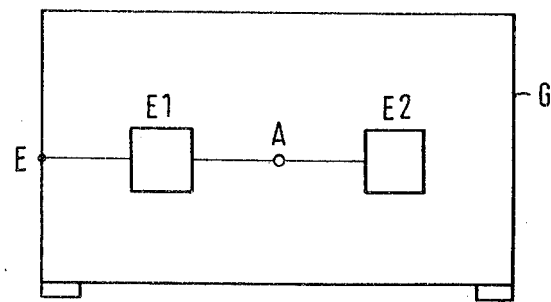
FIG. 1 shows schematically a circuit arrangement according to the invention.

A discriminator E1 has its input E connected to the housing G, while its output A is connected to the facility E2. In the single-pole representation chosen in FIG. 1 it should be noted that for the high-frequency discharging processes, the housing G, even if it is a metal housing, provides an inductive reactance with respect to ground. Accordingly, the discriminator E1 is highly sensitive to such interference voltages coupled in via the housing. Instead of to the housing G, the input of the discriminator E1 may also be connected to a wire lying as an antenna in an uncovered cable.

On the occurrence of an interference-voltage discharge whose magnitude and duration are such that the sequence of machine operations is likely to be disturbed, the discriminator E1 responds and controls the facility E2 in such a way that the use of the automatic machine is blocked. In this manner, any free use of the automatic machine is prevented, for example.

Figure 2:
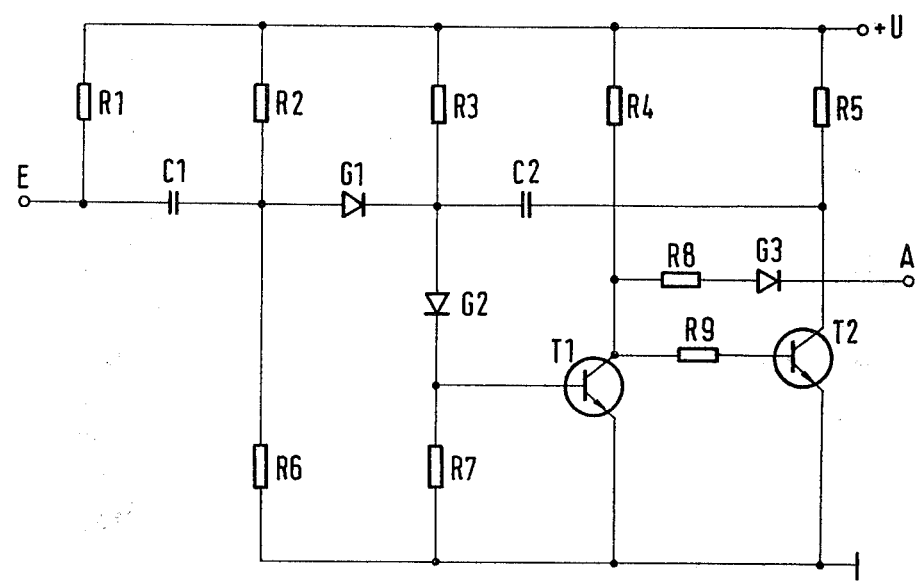
FIG. 2 shows a monostable multivibrator suitable for use as a discriminator in the circuit arrangement according to the invention.

The discriminator E1 is preferably a monostable multivibrator as shown in FIG. 2. The internal circuit of this monostable multivibrator is well known; in this example, it includes two coupled transistor stages T1, T2, with the output of the second stage coupled to the input of the first stage through a capacitor C2. This capacitor C2, in conjunction with resistors R2, R3, determines, in the known manner, the dwell time (unstable state) of the monostable multivibrator after switchover. At the end of the dwell time, the monostable multivibrator unblocks the automatic machine via the facility E2. Since the interference-voltage discharges are of short duration, the automatic machine is ready for use and fully functional again after the discharges have decayed, and no free use is possible.

We claim:

1. A circuit arrangement for use with automatically operating equipment including a facility having an input and an output and operative for detecting and interpreting internal faults of the equipment, and other electronic circuitry connected to the output of the facility and operative for controlling the operation of the equipment under the control of the facility, wherein the operation of the equipment could be influenced by electromagnetic radiation resulting from discharges of static interference voltages originating externally of the equipment, comprising:

means for receiving the electromagnetic radiation and for converting the same into an electric signal; and means for generating a control signal in response to said electric signal and for supplying the same to the input of the facility for use by the latter for blocking the operation of the equipment.

2. The circuit arrangement as defined in claim 1, wherein the equipment includes a metallic housing; and wherein said generating means has an input connected to the housing for the housing to serve as said receiving means.

3. The circuit arrangement as defined in claim 1, wherein said receiving means is an antenna; and wherein said generating means includes an input connected to said antenna.

4. The circuit arrangement as defined in claim 1, wherein said generating means is a discriminator.

5. The circuit arrangement as defined in claim 4, wherein said discriminator is a monostable multivibrator.

6. The circuit arrangement as defined in claim 5, wherein said monostable multivibrator has a dwell time in its unstable condition which exceeds the duration of any of the externally originating static interference voltages.

* * * * *